US010113486B2

(12) United States Patent
Mueller et al.

(10) Patent No.: US 10,113,486 B2
(45) Date of Patent: Oct. 30, 2018

(54) METHOD AND SYSTEM FOR MODULATED TURBINE COOLING

(71) Applicant: General Electric Company, Schenectady, NY (US)

(72) Inventors: John Herman Mueller, Hamilton, OH (US); Andrew Bradley Gebbia, West Chester, OH (US); Adam Robert Kahn, Mason, OH (US)

(73) Assignee: General Electric Company, Schenectady, NY (US)

( * ) Notice: Subject to any disclaimer, the term of this patent is extended or adjusted under 35 U.S.C. 154(b) by 346 days.

(21) Appl. No.: 14/876,543

(22) Filed: Oct. 6, 2015

(65) Prior Publication Data

US 2017/0096945 A1   Apr. 6, 2017

(51) Int. Cl.
*F02C 9/18*   (2006.01)
*F02C 7/12*   (2006.01)
(Continued)

(52) U.S. Cl.
CPC ............ *F02C 9/18* (2013.01); *F01D 5/02* (2013.01); *F01D 5/082* (2013.01); *F01D 5/088* (2013.01); *F02C 3/04* (2013.01); *F02C 7/12* (2013.01); *F02C 7/125* (2013.01); *F02C 7/18* (2013.01); *F02K 3/04* (2013.01); *F04D 29/321* (2013.01);
(Continued)

(58) Field of Classification Search
CPC .... F02C 9/18; F02C 7/12; F02C 7/125; F02C 7/18; F01D 5/02; F01D 5/082; F01D 5/088
See application file for complete search history.

(56) References Cited

U.S. PATENT DOCUMENTS 3,452,542 A * 7/1969 Saferstein ............... F01D 3/00
                                                    415/105
5,575,616 A   11/1996 Hagle et al.
(Continued)

FOREIGN PATENT DOCUMENTS

EP       1172523 A2    1/2002
WO    2014197089 A2   12/2014

OTHER PUBLICATIONS

European Search Report and Opinion issued in connection with corresponding EP Application No. 16192255.4 dated Feb. 22, 2017.

*Primary Examiner* — Steven Sutherland
(74) *Attorney, Agent, or Firm* — General Electric Company; Pamela Kachur (57) ABSTRACT

A method of transferring a fluid flow from a static component to a rotor of a gas turbine engine and a modulated flow transfer system are provided. The modulated flow transfer system includes an annular inducer configured to accelerate the fluid flow in a substantially circumferential direction in a direction of rotation of the rotor. The system further includes a first fluid flow supply including a compressor bleed connection, a feed manifold formed of bendable tubing, and a feed header extending between the compressor bleed connection and the feed manifold. The feed header includes a modulating valve configured to control an amount of fluid flow into the feed manifold. The system also includes a flow supply tube that extends between the feed manifold and the inducer and is couplable to at least one of the plurality of first fluid flow inlet openings through a sliding piston seal.

19 Claims, 7 Drawing Sheets

(51) Int. Cl.
  *F01D 5/08*   (2006.01)
  *F01D 5/02*   (2006.01)
  *F02C 3/04*   (2006.01)
  *F02C 7/18*   (2006.01)
  *F02K 3/04*   (2006.01)
  *F04D 29/32*  (2006.01)

(52) U.S. Cl.
  CPC ........ *F04D 29/325* (2013.01); *F05D 2220/36* (2013.01); *F05D 2230/642* (2013.01); *F05D 2240/129* (2013.01); *F05D 2240/35* (2013.01); *F05D 2240/58* (2013.01); *F05D 2250/322* (2013.01); *F05D 2260/16* (2013.01); *F05D 2260/607* (2013.01); *Y02T 50/671* (2013.01); *Y02T 50/676* (2013.01)

(56) References Cited

U.S. PATENT DOCUMENTS

| | | | |
|---|---|---|---|
| 6,050,079 A | 4/2000 | Durgin et al. | |
| 6,540,477 B2 | 4/2003 | Glynn et al. | |
| 7,458,766 B2 | 12/2008 | Dailey et al. | |
| 7,765,809 B2 | 8/2010 | Brown et al. | |
| 8,307,662 B2 | 11/2012 | Turco | |
| 8,408,868 B2 | 4/2013 | Hatman | |
| 8,495,883 B2 | 7/2013 | Foust et al. | |
| 8,529,195 B2 | 9/2013 | Widener | |
| 8,578,720 B2 * | 11/2013 | Ebert | F01D 5/081 415/115 |
| 2009/0320496 A1 * | 12/2009 | Faulder | F01D 25/305 60/785 |
| 2013/0243576 A1 | 9/2013 | Tsutsumi et al. | |
| 2013/0323011 A1 * | 12/2013 | Chopra | F01D 5/082 415/1 |
| 2014/0290254 A1 | 10/2014 | Manning et al. | |

* cited by examiner

METHOD AND SYSTEM FOR MODULATED TURBINE COOLING

BACKGROUND

The field of the disclosure relates generally to gas turbine engines and, more particularly, to a method and system for suppressing resonance in air bleeding systems in gas turbine engines.

Gas turbine engines typically include cooling systems which provide cooling air to turbine rotor components, such as turbine blades, to limit the temperatures experienced by such components. At least some known gas turbine engines channel the air used to cool turbine components from the engine's compressor. The air, which is diverted from the compressor is channeled to the turbine section of the gas turbine engine through a passageway. A device commonly known as an inducer is generally located at the exit end of such an axial passageway and is used to accelerate and direct the airflow towards passages in the rotating rotor. Such inducers are used to control the speed and direction of the airflow.

In known cooling systems, the amount of cooling flow is generally fixed at a level required to achieve requisite cooling at the maximum turbine inlet temperature point for the engine. Because gas turbine engines are usually operated at conditions that are at less than maximum turbine inlet temperature, the gas turbine engine normally operates with an excess cooling flow and decreased efficiency. This excess cooling also has the effect of increasing fuel consumption.

BRIEF DESCRIPTION

In one aspect, a modulated flow transfer system includes an annular inducer configured to accelerate the fluid flow in a substantially circumferential direction in a direction of rotation of the rotor. The inducer including a row of a plurality of first and second fluid flow outlet openings extending circumferentially about a first face of the inducer. The inducer includes a row of a plurality of first and second fluid flow inlet openings extending circumferentially about a second face of the inducer. The system includes a first fluid flow supply including a compressor bleed connection, a feed manifold formed of bendable tubing, and a feed header extending between the compressor bleed connection and the feed manifold. The feed header includes a modulating valve configured to control an amount of fluid flow into the feed manifold. The system also includes a flow supply tube that extends between the feed manifold and the inducer and is couplable to at least one of the plurality of first fluid flow inlet openings through a sliding piston seal.

In another aspect, a method of cooling a turbine rotor includes selectively channeling a first flow of cooling air through a manifold formed of bendable tubing, the manifold circumscribing a portion of the turbine rotor and channeling the first flow of cooling air to an inlet opening of a plurality of first inlet openings of an annular inducer through a feed tube extending axially aftward from the manifold to the inlet opening. The method also includes accelerating the first flow of cooling air through a profiled passageway from the inlet opening to a slotted outlet opening, the slotted outlet opening extending approximately 45° of a circumference of an outlet face of the inducer. The method further includes turning the first flow of cooling air in the profiled passageway from the inlet opening to the slotted outlet opening such that the first flow of cooling air exits the slotted outlet opening in a direction approximately 60° from a centerline of the profiled passageway at the slotted outlet opening.

In yet another aspect, a turbofan engine includes a core engine including a multistage compressor, a fan powered by a power turbine driven by gas generated in the core engine, and a fan bypass duct at least partially surrounding the core engine, and the fan. The turbofan engine includes a modulated flow transfer system for transferring a fluid flow from the multistage compressor to a rotor of the core engine and that includes a first fluid flow supply including a bleed connection from the multistage compressor, a feed manifold formed of bendable tubing, and a feed header extending between the bleed connection and the feed manifold. The feed header includes a modulating valve configured to control an amount of first fluid flow from the bleed connection into the feed manifold, a flow supply tube extending axially aftward from the feed manifold, and an annular inducer configured to receive the first fluid flow from the first fluid flow supply through the flow supply tube, the inducer is configured to accelerate the fluid flow in a substantially circumferential direction in a direction of rotation of the rotor, the inducer including a row of a plurality of first and second fluid flow outlet openings extending circumferentially about the inducer, the inducer further including a row of a plurality of first and second fluid flow inlet openings extending circumferentially about the inducer.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of the modulated turbine cooling (MTC) systems described herein provide a cost-effective method for providing cooling air from a static or stationary component to a rotating component onboard a rotor of a gas turbine engine than is currently available. The MTC systems include an annular inducer that circumscribes at least a portion of a core engine. The inducer is configured to accelerate a flow of cooling air in a substantially circumferential direction, for example, at an angle of approximately 70° with respect to an axial centerline of an outlet opening of the inducer in a direction of rotation of the rotor. Accelerating and turning the flow of cooling air permits an efficient transfer of the flow of cooling air from the stationary inducer to the rotating rotor. In one embodiment, the flow of cooling air is accelerated to approximately the same velocity as the rotor. In another embodiment, the flow of cooling air is accelerated to a velocity that is greater than the angular velocity of the rotor. The inducer includes a row of a plurality of fluid flow outlet openings on an aft side of the inducer. The outlet openings may be spaced circumferentially approximately equidistantly about an outlet face of the inducer. In the exemplary embodiment, two of a total of eight of the fluid flow outlet openings are supplied from a compressor bleed connection and is modulated by respective valves. Also in the exemplary embodiment, six of the total of eight of the fluid flow outlet openings are supplied from a space between the rotor and a combustor of the gas turbine engine. Although, the examples herein illustrate an inducer having eight openings through the inducer, other numbers of openings can be used.

A first fluid flow supply includes a compressor bleed connection, a feed manifold formed of bendable tubing circumscribing a portion of the core engine, and a feed header extending between the compressor bleed connection and the feed manifold. The feed header includes a modulating valve configured to control an amount of fluid flow into the feed manifold.

The MTC systems further include a flow supply tube extending between the feed manifold and the inducer. The flow supply tube is couplable to the fluid flow inlet openings through a sliding piston seal. The sliding piston seal permits an axial range of motion between the flow supply tube and the inducer to reduce a cyclic fatigue due to temperature gradients experienced between various modes of operation and levels of power output of the gas turbine engine. Moreover, the flow supply tube includes a circular cross-section.

Figure 1:
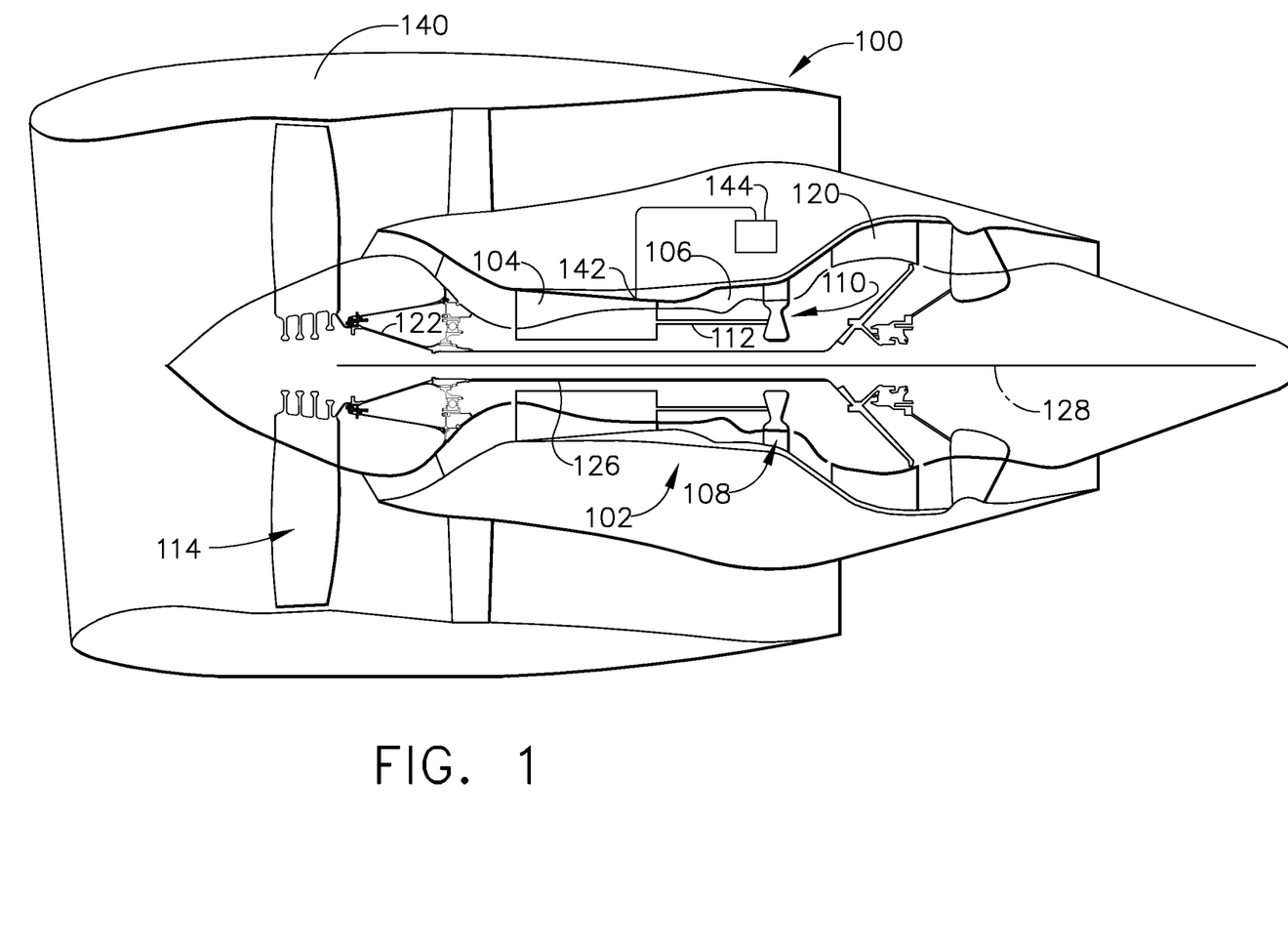
FIG. 1 is a schematic illustration of an exemplary gas turbine engine in accordance with an example embodiment of the present disclosure.

FIG. 1 is a schematic illustration of an exemplary gas turbine engine 100. Gas turbine engine 100 includes a gas generator or core engine 102 that includes a high pressure compressor (HPC) 104, a combustor assembly 106, and a high pressure turbine (HPT) 108 in an axial serial flow relationship on a core engine rotor 110 rotating about a core engine shaft 112. Gas turbine engine 100 also includes a low pressure compressor or fan 114 and a low pressure turbine 120 arranged in an axial flow relationship on a power engine rotor 122 rotating about a power engine shaft 126.

During operation, air flows along a central axis 128, and compressed air is supplied to high pressure compressor 104. The highly compressed air is delivered to combustor assembly 106. Exhaust gas flow (not shown in FIG. 1) from combustor assembly 106 drives turbines 108 and 120, and turbine 120 drives fan or low pressure compressor 114 by way of shaft 126. Gas turbine engine 100 also includes a fan or low pressure compressor containment case 140. Cooling air is bled from a compressor bleed connection 142 and channeled to a modulated turbine cooling (MTC) system 144.

Figure 2:
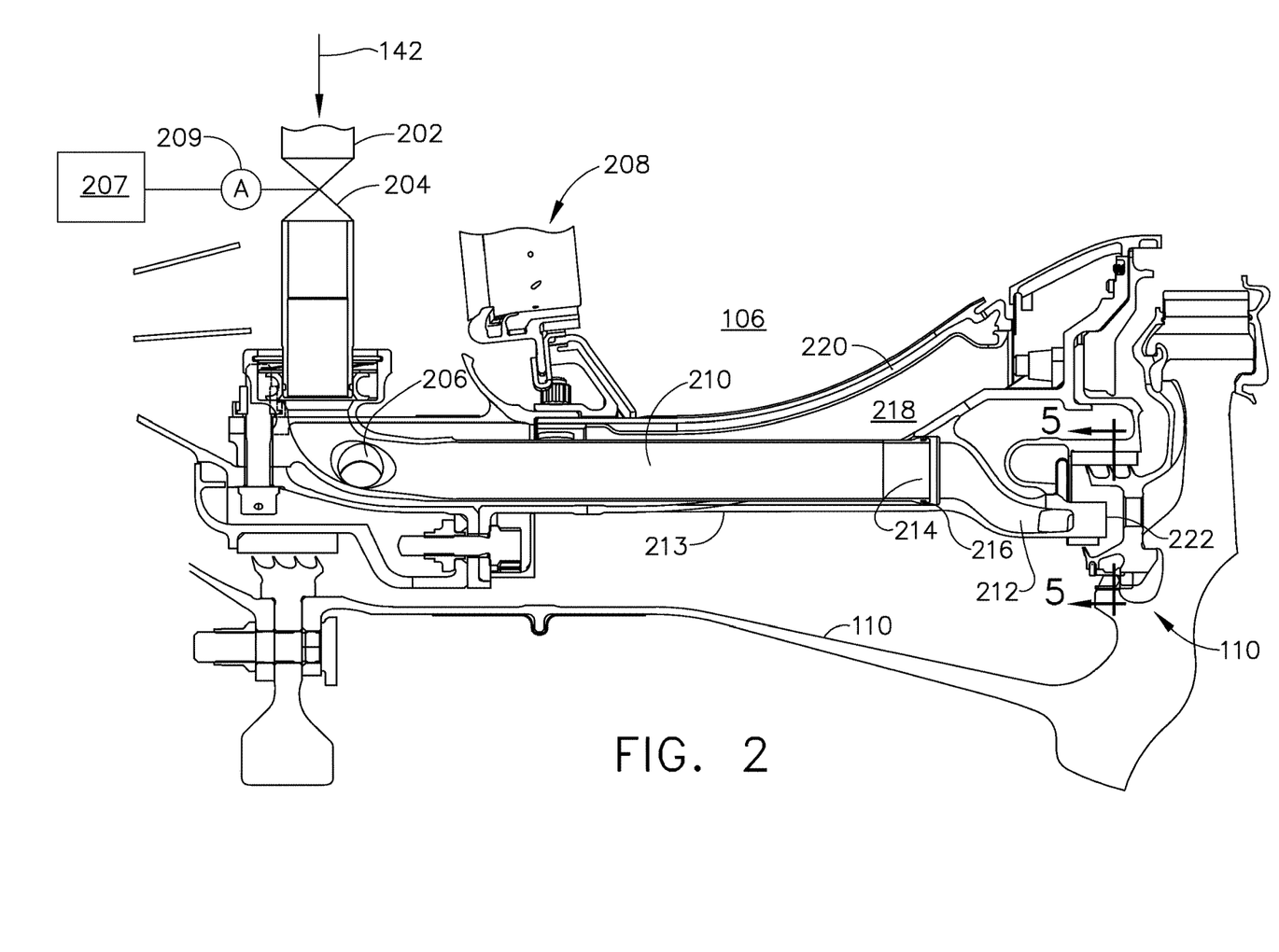
FIG. 2 is a side view of the modulated turbine cooling system shown in FIG. 1.

FIG. 2 is a side view of MTC system 144 in accordance with an exemplary embodiment of the present invention. In the exemplary embodiment, cooling air is channeled from compressor bleed connection 142 (shown in FIG. 1) to feed header 202 that includes a modulating valve 204 configured to control an amount of fluid flow into a feed manifold 206. A controller 207 may be used to control an actuator 209 of modulating valve 204 to selectively prevent channeling cooling air from compressor bleed connection 142 (shown in FIG. 1) to feed header 202 during a cruise mode of engine operation and permitting channeling cooling air from compressor bleed connection 142 (shown in FIG. 1) to feed header 202 during a high-power mode of engine operation, such as during take-off of an aircraft. In various embodiments, modulating valves 204 fail in an open position to permit channeling cooling air from compressor bleed connection 142 (shown in FIG. 1) to feed header 202. Feed manifold 206 at least partially circumscribes rotor 110 of core engine 102 proximate a forward end 208 of combustor assembly 106. Feed manifold 206, in the exemplary embodiment, is formed of bendable tubing, as opposed to being a cast component. The bendable tubing is of lighter weight and may be routed to accommodate clearance issues proximate feed manifold 206. In addition to the bendable tubing, feed manifold 206 is formed of connecting components (not shown in FIG. 2) configured to, for example, join two portions of feed manifold 206 and/or feed manifold 206 with another header or manifold, as will be described below.

MTC system 144 includes a flow supply tube 210 extending between feed manifold 206 and an aft end 212 of an inducer 213. Flow supply tube 210 is couplable to some of a plurality of fluid flow inlet openings 214 of inducer aft end 212 through a sliding piston seal 216. Others of the plurality of fluid flow inlet openings 214 are supplied with cooling air from a space 218 between inducer 213 and an inner wall 220 of combustor assembly 106. Sliding piston seal 216 permits an axial range of motion between flow supply tube 210 and inducer 213 to reduce a cyclic fatigue due to temperature gradients experienced between various modes of operation and levels of power output of gas turbine engine 100. Moreover, flow supply tube 210 includes an approximately circular cross-section. Inducer 213 circumscribes at least a portion of rotor 110 of core engine 102. Inducer 213 is configured to accelerate a flow of cooling air in a substantially circumferential direction, for example, at an angle of approximately 70° with respect to an axial centerline of an outlet opening 222 of inducer 213 in a direction of rotation of rotor 110. Accelerating and turning the flow of cooling air permits an efficient transfer of the flow of cooling air from the stationary inducer 213 to the rotating rotor 110. In one embodiment, the flow of cooling air is accelerated to a velocity greater than or equal to that of rotor 110.

Figure 3A:
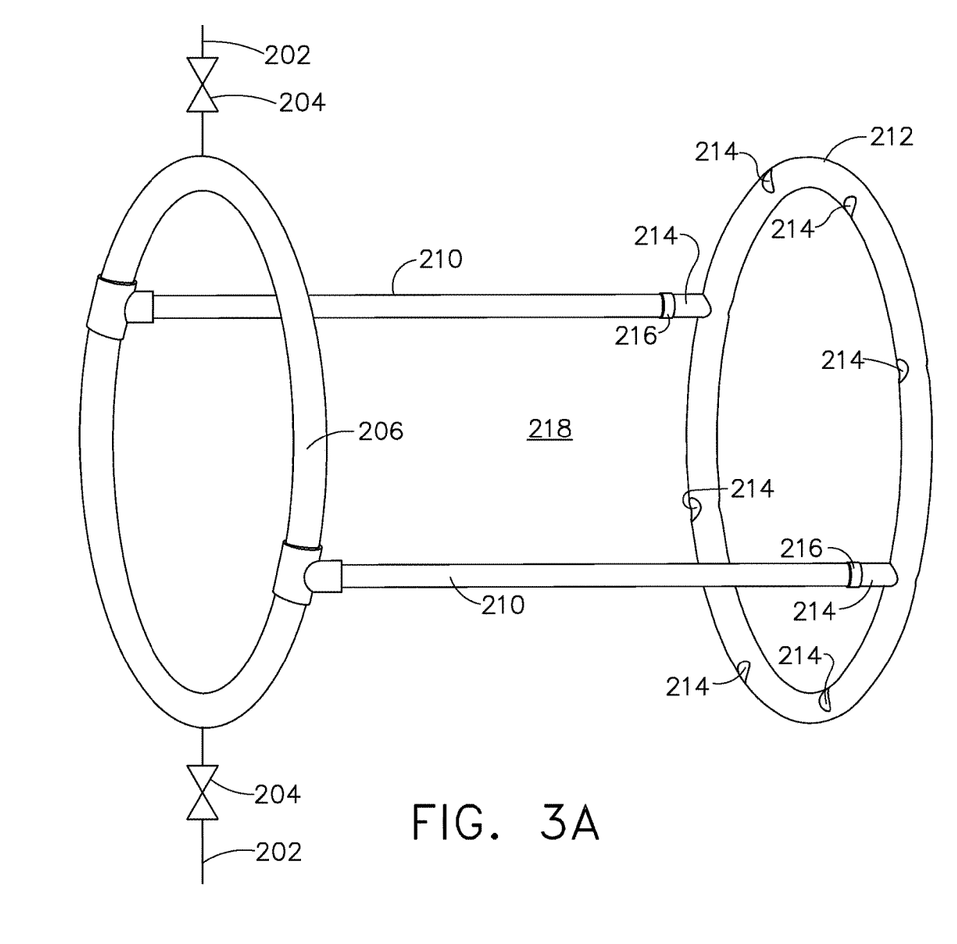
FIG. 3A is a schematic diagram of the modulated turbine cooling system shown in FIG. 1 isolated from the gas turbine engine shown in FIG. 1.
Figure 3B:
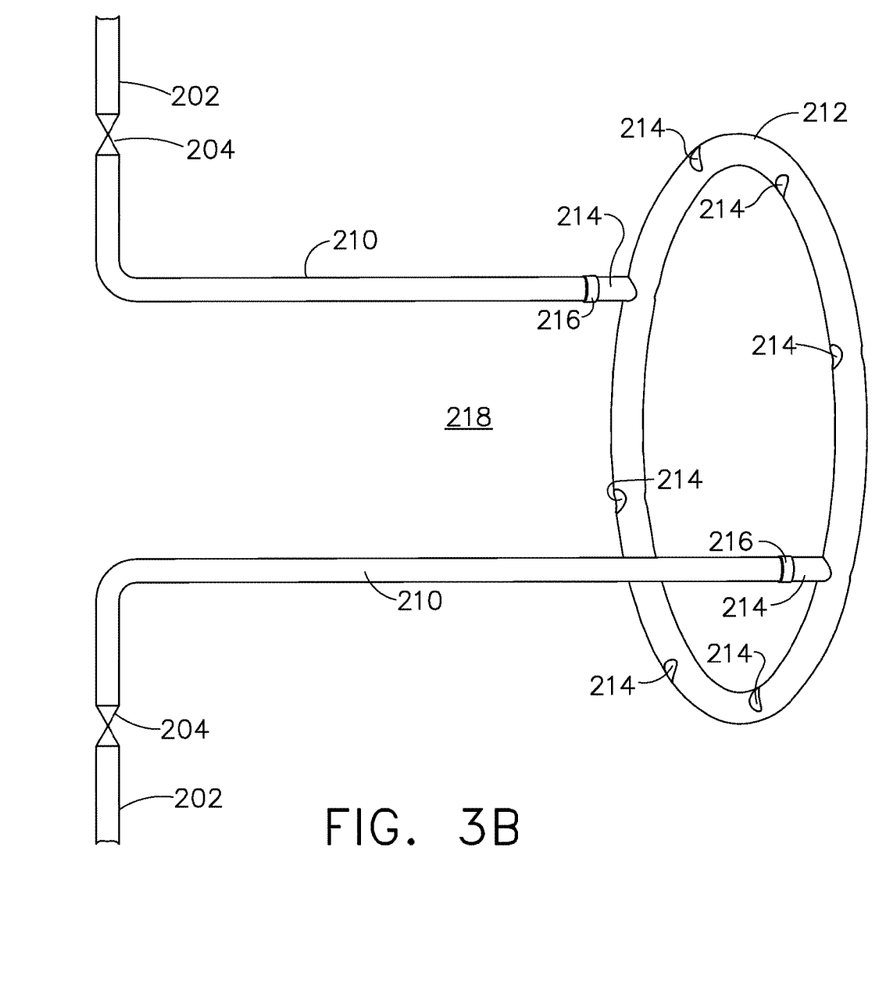
FIG. 3B is a schematic diagram of the modulated turbine cooling system shown in FIG. 1 isolated from the gas turbine engine shown in FIG. 1 with each flow supply tube fed directly from a respective modulating valve without use of the header shown in FIG. 3A.

FIG. 3A is a schematic diagram of MTC system 144 isolated from gas turbine engine 100. FIG. 3B is a schematic diagram of the modulated turbine cooling system shown in FIG. 1 isolated from the gas turbine engine shown in FIG. 1 with each flow supply tube fed directly from a respective modulating valve without use of the header shown in FIG. 3A. In the exemplary embodiment, inducer 213 includes eight inlet openings 214. Two inlet openings 214 receive a first flow of cooling air from compressor bleed connection 142 (shown in FIG. 1). Six inlet openings 214 receive a second flow of cooling air from space 218. Accordingly, two of eight fluid flow inlet openings 214 are modulated by MTC system 144 and six of eight fluid flow inlet openings 214 receive non-modulated cooling air from space 218. In other embodiments, any number of inlet openings 214 may receive a first flow of cooling air from compressor bleed connection 142 (shown in FIG. 1) with the remaining number of inlet openings 214 receiving a second flow of cooling air from space 218. Accordingly, the number of inlet openings 214 that receive modulated cooling air may be zero, thus providing no modulated cooling air flow, wherein all cooling air is received from space 218. The number of inlet openings 214 that receive modulated cooling air may be eight, or more, such as in cases where there are more than eight inlet openings 214, thus providing up to 100% modulated cooling air flow.

Figure 4:
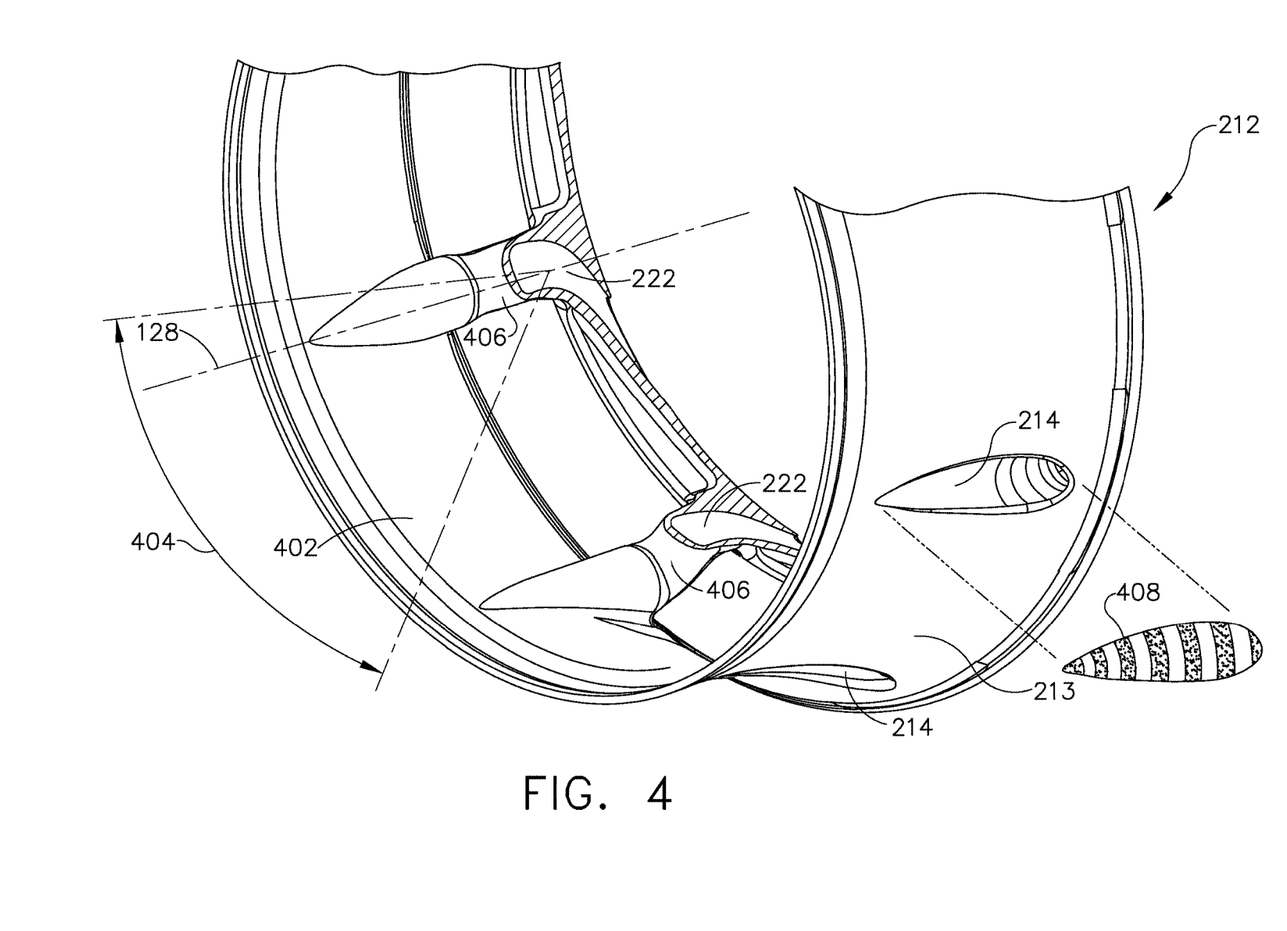
FIG. 4 is a perspective view of a portion of the inducer shown in FIG. 2.

FIG. 4 is a perspective view of a portion of inducer 213 (shown in FIG. 2). In the exemplary embodiment, inducer 213 includes an annular body 402 having eight sectors 404, each comprising approximately a 45° arc of a circumference of inducer 213. Each sector 404 includes a respective fluid flow inlet opening 214, fluid flow outlet opening 222, and a passageway 406 that extends therebetween. Fluid flow inlet openings 214 include a teardrop shape configured to receive a flow of cooling air from either MTC system 144 (shown in FIGS. 1, 2, and 3) or from space 218 (shown in FIG. 2). The fluid flow inlet openings 214 that receive the flow of cooling air from space 218 may be equipped with a particulate screen 408 that includes a tortuous path that forces the flow of cooling air to change direction prior to entering fluid flow inlet opening 214. The momentum of any particulate, water, vapor, and/or ice entrained in the flow of cooling air will carry the particulate, water, vapor, and/or ice beyond fluid flow inlet opening 214 before it will be able to turn to enter fluid flow inlet opening 214.

Passageway 406 is a converging passage that accelerates the flow of cooling air while directing the flow of cooling air in a tangential or circumferential direction. Accordingly, the flows of cooling air exiting fluid flow outlet openings 222 have a velocity vector with a large aftward axial component and a large circumferential component in a direction of a rotation of rotor 110 (shown in FIGS. 1 and 2).

Figure 5:
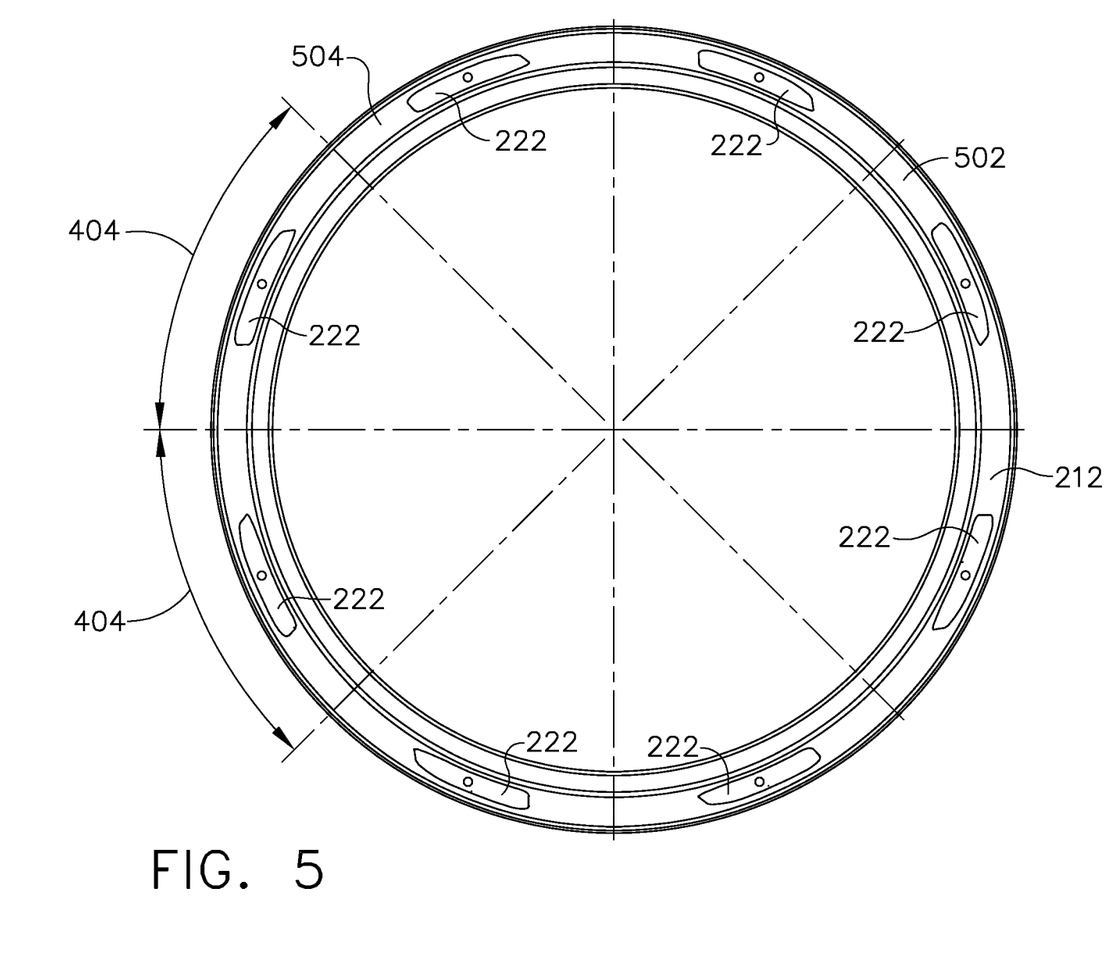
FIG. 5 is an axial view of the inducer shown in FIG. 2 looking forward and taken along lines 5-5 as shown in FIG. 2.

FIG. 5 is an axial view of inducer 213 looking forward from a first stage of HPT 108 and taken along lines 5-5 as shown in FIG. 2. Inducer 213 includes a row of eight fluid flow outlet openings 222 on an aft side 502 of inducer 213. Fluid flow outlet openings 222 may be spaced circumferentially approximately equidistantly about an outlet face 504 of inducer 213. In the exemplary embodiment, two of a total of eight of fluid flow outlet openings 222 are supplied from compressor bleed connection 142 and the fluid flows to these two fluid flow outlet openings 222 are modulated by respective valves 204. Also, in the exemplary embodiment, six of the total of eight of fluid flow outlet openings 222 are supplied from space 218 between rotor 110 and combustor assembly 106 of gas turbine engine 100. Although, the examples herein illustrate inducer 213 having eight openings through inducer 213, other numbers of openings can be used and modulated.

Figure 6:
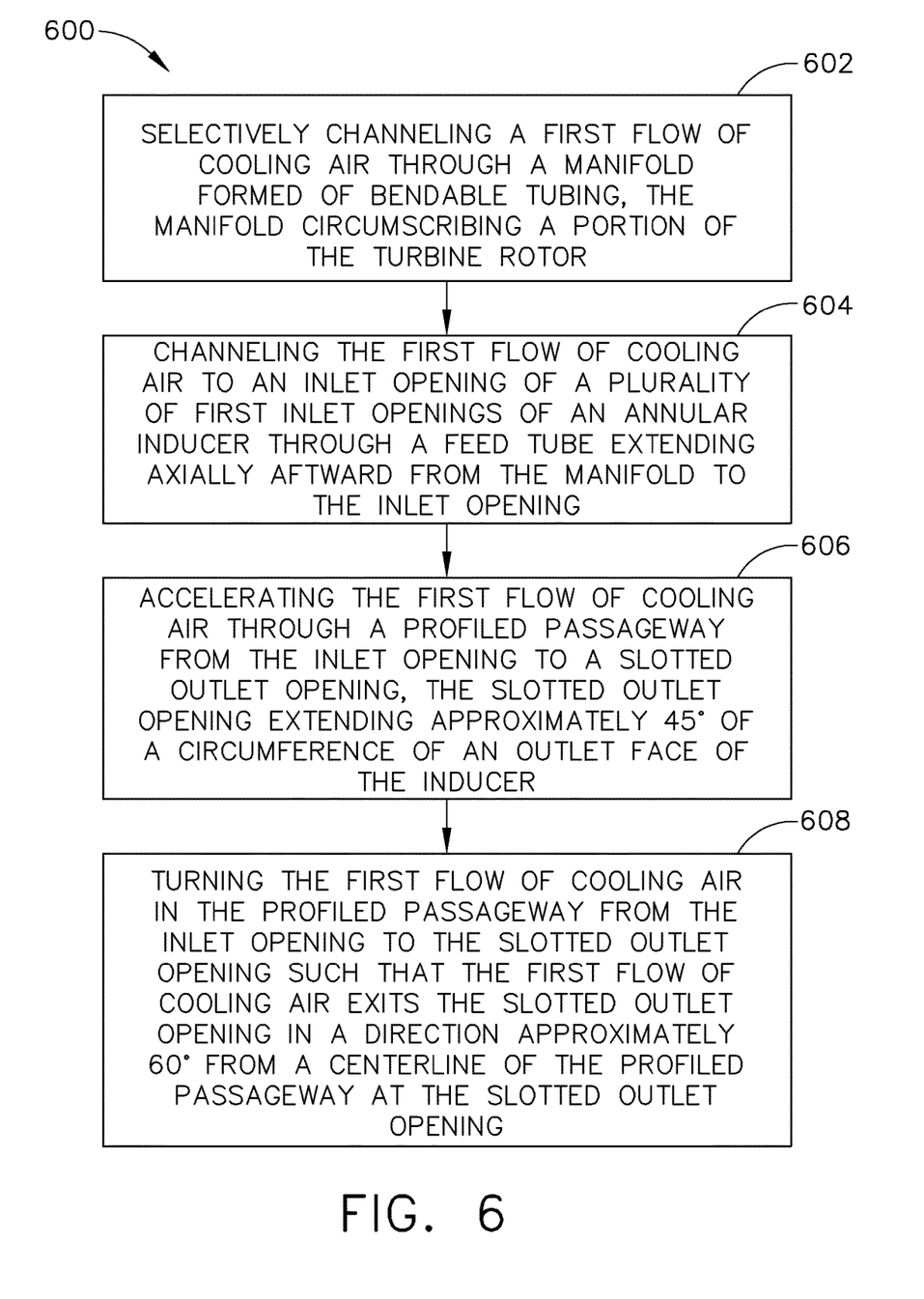
FIG. 6 is a flow diagram of an exemplary method of cooling a turbine rotor.

FIG. 6 is a flow diagram of an exemplary method 600 of cooling a turbine rotor. In the example embodiment, method 600 includes selectively channeling 602 a first flow of cooling air through a manifold formed of bendable tubing, the manifold circumscribing a portion of the turbine rotor. The cooling air is supplied to the manifold through a header that includes one or more modulating valves. The modulating valves are controlled between an open or shut state by a controller. In one embodiment, at least one valve is open, for example, during a take-off mode of an aircraft of which the turbine rotor is part. The controller may also command the modulating valves to a closed position or a partially closed position during a second cruise mode when a reduced amount of cooling is sufficient for the turbine rotor.

Method 600 also includes channeling 604 the first flow of cooling air to an inlet opening of a plurality of first inlet openings of an annular inducer through a feed tube extending axially aftward from the manifold to the inlet opening. In the example embodiment, the annular inducer includes eight inlet openings to admit the cooling air into passages through the annular inducer from an upstream or forward end to a downstream or aft end of the annular inducer. In the example embodiment, two of the eight inlet openings are supplied with cooling air from compressor bleed air and the modulated turbine cooling (MTC) system. Such a configuration permits matching an amount of cooling air flow to a mode dictated cooling air requirement. The eight inlet openings include a circular cross-section into a curved surface of the inducer such that the opening on the curved surface is a teardrop shape axially-aligned with the more narrow portion of the teardrop shape towards the forward end of the curved surface and the wider portion of the teardrop shape oriented towards the aft end of the curved surface. The inlet openings that are supplied with CDP air can be fitted with a particulate screen that is complementarily teardrop-shaped and including a tortuous profile for the cooling air to take before entering the respective passage through the inducer. The tortuous path may be formed by a series of spaced apart channels that force the cooling air to make a radical direction change prior to it entering the inlet opening. The momentum of the particulates, water, ice, and the like entrained in the cooling air caries the particulates, water, ice past the inlet opening before the particulates, water, ice can turn and enter the inlet openings and are thus carried through the gas turbine engine.

Method 600 further includes accelerating the first flow of cooling air through a respective profiled passageway from the inlet openings to respective slotted outlet openings. The slotted outlet openings each extend approximately 45° of a circumference of an outlet face of the inducer. The profiled passage is configured to accelerate the cooling air flowing through the passage. Method 600 also includes turning the first flow of cooling air in the profiled passageway from the inlet opening to the slotted outlet opening such that the first flow of cooling air exits the slotted outlet opening in a direction approximately 60° from a centerline of the profiled passageway at the slotted outlet opening. The profiled passageway is configured to turn the cooling air flow circumferentially in the direction of rotation of the rotor. The cooling air is turned at an acute angle with respect to a face of the outlet opening. In one embodiment, the cooling air is turned at an angle of greater than 60° with respect to a face of the outlet opening. In another embodiment, the cooling air is turned at an angle of greater than 70° with respect to a face of the outlet opening. The angle of turning of the cooling air and the amount of acceleration of the cooling air attempts to match the velocity vector of the cooling air flow with openings in the rotor for an efficient transfer of the cooling air from the inducer to the rotor.

The above-described bleed systems provide an efficient method for modulated cooling of gas turbine engine turbine components. Specifically, the above-described modulated turbine cooling system includes a compressor bleed connection that selectively supplies an additional amount of cooling air to turbine components, for example, when the aircraft is in a high-power or take-off mode of operation and the associated valve is open.

An exemplary technical effect of the methods, systems, and apparatus described herein includes at least one of: (a) reducing an inducer ingestion area to minimize dust and/or dirt ingestion by portions of the gas turbine engine, (b) simplifying assembly and sealing concepts for MTC system, (c) reducing overall system weight while maintaining or improving engine performance and mitigating thermal risks to inner combustor liner, (d) providing a mechanical means to deliver modulated cooling flow to a first stage high pressure turbine blade circuit, (e) providing a new method for reducing dust/dirt ingestion into the high pressure first stage blade cooling circuit by reducing the inlet area to the inducer, (f) configuring the inducer inlets to present an efficient load path to stress induced in the inducer from a nozzle of a first stage of a high pressure turbine of the gas turbine engine, (g) enlarging and reducing a number of inducer passages to improve flow and reduce weight.

Exemplary embodiments of modulated turbine cooling systems are described above in detail. The modulated turbine cooling systems, and methods of operating such systems and component devices are not limited to the specific embodiments described herein, but rather, components of the systems and/or steps of the methods may be utilized independently and separately from other components and/or steps described herein. For example, the methods may also be used in combination with other systems requiring a transfer of fluid flow from a static component to a rotating component, and are not limited to practice with only the systems and methods as described herein. Rather, the exemplary embodiment can be implemented and utilized in connection with many other machinery applications that are currently configured to receive and accept modulated cooling systems.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A modulated flow transfer system for transferring a fluid flow from a static component to a rotor of a gas turbine engine, said modulated flow transfer system comprising:
    an annular inducer configured to accelerate the fluid flow in a substantially circumferential direction in a direction of rotation of the rotor, said annular inducer comprising a row of a plurality of first and second fluid flow outlet openings extending circumferentially about a first face of said annular inducer, said annular inducer further comprising a row of a plurality of first and second fluid flow inlet openings extending circumferentially about a second face of said annular inducer, wherein at least one opening of said plurality of second fluid flow inlet openings comprises a teardrop shape on a curved surface of said annular inducer, said teardrop shape configured to present an efficient load path to stress induced in said annular inducer from a nozzle of a high pressure turbine of the gas turbine engine;
    a first fluid flow supply comprising a compressor bleed connection, a feed manifold formed of bendable tubing, and a feed header extending between said compressor bleed connection and said feed manifold, said feed header comprising a modulating valve configured to control an amount of fluid flow into said feed manifold; and
    a flow supply tube extending between said feed manifold and said annular inducer, said flow supply tube configured to be coupled to at least one opening of said plurality of first fluid flow inlet openings through a sliding piston seal.

2. The modulated flow transfer system of claim 1, wherein said feed manifold at least partially circumscribes the rotor of the gas turbine engine proximate a forward end of a combustor assembly.

3. The modulated flow transfer system of claim 1, wherein said feed manifold comprises a direct flexible tubing connection between the compressor bleed connection and a respective flow supply tube.

4. The modulated flow transfer system of claim 1, further comprising a controller configured to control said modulating valve, said controller and said modulating valve are configured to selectively modulate fluid flow into said feed manifold during a cruise mode of engine operation and during a takeoff mode of engine operation.

5. The modulated flow transfer system of claim 1, wherein said annular inducer is static with respect to the rotor.

6. The modulated flow transfer system of claim 1, wherein said flow supply tube extends axially between said feed header and a respective one of said plurality of first fluid flow inlet openings.

7. The modulated flow transfer system of claim 1, wherein said plurality of first and second fluid flow outlet openings extend approximately equidistantly about said annular inducer.

8. The modulated flow transfer system of claim 1, further comprising a plurality of fluid flow passages extending between respective ones of said plurality of fluid flow inlet openings and said plurality of fluid flow outlet openings.

9. The modulated flow transfer system of claim 1, wherein at least one of said second fluid flow inlet openings comprises a particle screen configured to present a tortuous path to the fluid flow entering said plurality of second fluid flow inlet openings.

10. A method of cooling a turbine rotor, said method comprising:
- selectively channeling a first flow of cooling air through a manifold formed of bendable tubing, the manifold circumscribing a portion of the turbine rotor;
- channeling the first flow of cooling air to an inlet opening of a plurality of first inlet openings of an annular inducer through a feed tube extending axially aftward from the manifold to said inlet opening of the plurality of first inlet openings;
- accelerating the first flow of cooling air through a profiled passageway from said inlet opening of the plurality of first inlet openings to a slotted outlet opening, the slotted outlet opening extending approximately 45° of a circumference of an outlet face of the annular inducer;
- turning the first flow of cooling air in the profiled passageway from the inlet opening to the slotted outlet opening such that the first flow of cooling air exits the slotted outlet opening in a direction at least approximately 60° from a centerline of the profiled passageway at the slotted outlet opening;
- channeling a second flow of cooling air to at least one inlet opening of a plurality of second inlet openings of the annular inducer, the at least one inlet opening of the plurality of second inlet openings defining a teardrop shape on a curved surface of the annular inducer providing an efficient load path to stress induced in the annular inducer from a nozzle of a high pressure turbine of the gas turbine engine.

11. The method of claim 10, further comprising channeling the second flow of cooling air to the at least one inlet opening of the plurality of second inlet openings of the annular inducer through an inlet screen configured to present a tortuous path to the second flow of cooling air as it enters the at least one inlet opening of a plurality of second inlet openings.

12. The method of claim 10, further comprising channeling a first flow of cooling air to the manifold through a selectively controllable valve.

13. The method of claim 10, wherein turning the first flow of cooling air comprises turning the first flow of cooling air through the profiled passageway from the inlet opening to the slotted outlet opening such that the first flow of cooling air exits the slotted outlet opening in a direction at least approximately 70° from a centerline of the profiled passageway at the slotted outlet opening.

14. The method of claim 10, wherein accelerating the first flow of cooling air through a profiled passageway comprises accelerating the first flow of cooling air through a convergent passageway having an inlet/outlet ratio of approximately 4:1.

15. A turbofan engine comprising:
- a core engine including a multistage compressor;
- a fan powered by a power turbine driven by gas generated in said core engine;
- a fan bypass duct at least partially surrounding said core engine and said fan; and
- a modulated flow transfer system for transferring a fluid flow from said multistage compressor to a rotor of said core engine, said modulated flow transfer system comprising:
  - a first fluid flow supply comprising a bleed connection from said multistage compressor, a feed manifold formed of bendable tubing, and a feed header extending between said bleed connection and said feed manifold, said feed header comprising a modulating valve configured to control an amount of first fluid flow from said bleed connection into said feed manifold;
  - a flow supply tube extending axially aftward from said feed manifold; and
  - an annular inducer configured to receive the first fluid flow from said first fluid flow supply through said flow supply tube, said annular inducer configured to accelerate the first fluid flow in a substantially circumferential direction in a direction of rotation of said rotor, said annular inducer comprising a row of a plurality of first and second fluid flow outlet openings extending circumferentially about said annular inducer, said annular inducer further comprising a row of a plurality of first and second fluid flow inlet openings extending circumferentially about said annular inducer, wherein at least one opening of said plurality of second fluid flow inlet openings comprises a teardrop shape on a curved surface of said annular inducer, said teardrop shape configured to present an efficient load path to stress induced in said annular inducer from a nozzle of a high pressure turbine of the gas turbine engine.

16. The turbofan engine of claim 15, further comprising a second fluid flow supply comprising a second fluid flow from a discharge of said multistage compressor, the second fluid flow channeled through a space between said rotor and an inner casing wall to the plurality of second fluid flow inlet openings in said annular inducer.

17. The turbofan engine of claim 15, further comprising a controller configured to control said modulating valve, said controller and said modulating valve configured to selectively shutoff fluid flow into said feed manifold during a cruise mode of engine operation and permitting fluid flow into said feed manifold during a takeoff mode of engine operation.

18. The turbofan engine of claim 15, wherein said flow supply tube extends axially between said feed header and a respective one of said plurality of first fluid flow inlet openings.

19. The turbofan engine of claim 15, wherein at least one opening of said second fluid flow inlet openings comprises a particle screen, said particle screen configured to present a tortuous path to fluid entering said plurality of second fluid flow inlet openings.

* * * * *